Sept. 27, 1938. A. F. SPITZGLASS 2,131,486
FLUID METER
Filed Aug. 20, 1936 3 Sheets-Sheet 1

Inventor
Albert F. Spitzglass
by McConkey + Booth
Attorneys

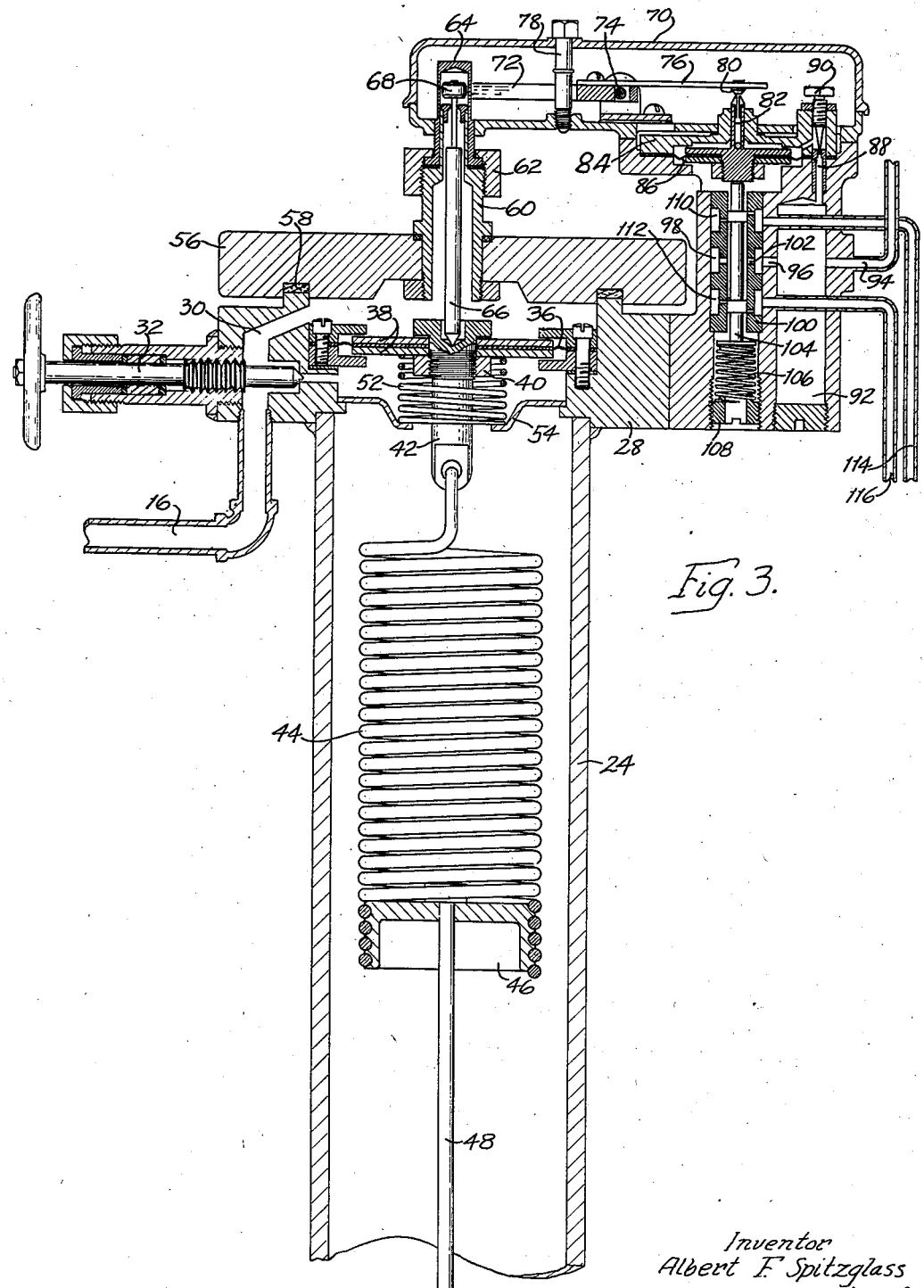

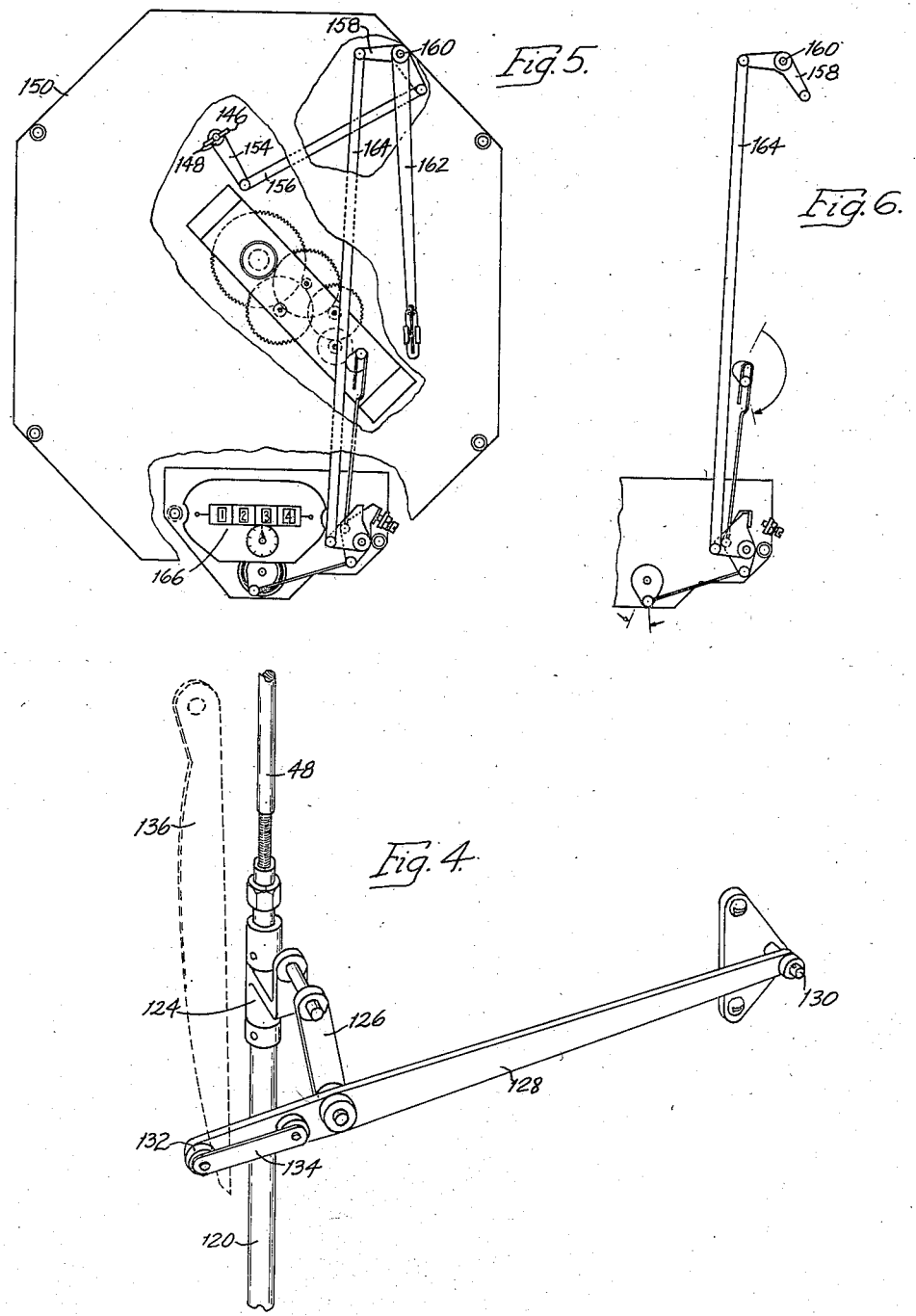

Patented Sept. 27, 1938

2,131,486

UNITED STATES PATENT OFFICE 2,131,486

FLUID METER

Albert F. Spitzglass, Chicago, Ill., assignor to Republic Flow Meters Company, Chicago, Ill., a corporation of Illinois Application August 20, 1936, Serial No. 96,931

5 Claims. (Cl. 73—205)

This invention relates to meters and the like, and is illustrated as embodied in a flow meter operated by power under the control of the condition whose values are being measured and which are to be indicated by the pressure.

An object of the invention is to provide a meter adapted to measure the flow, or other variable, of a corrosive fluid. To this end, the parts of the meter which come in contact with the fluid are limited in number, and are arranged separately from the rest of the meter mechanism, so that they may readily be made of materials which are not attacked by the fluid being metered.

A related object has to do with sealing the chamber containing these parts by means acting against a part which is directly connected to and operated by the power means of the meter, so that the sensitivity of the meter is in no way affected even if it is necessary to provide a very tight joint with considerable friction.

Another object of the invention has to do with the operation of the meter by power under the control of a sensitive device such as a pilot valve shifted by pressure graduated in a novel manner according to the measured quantities being measured.

The above and other objects and features of the invention, including various novel combinations of parts and desirable particular constructions, will be apparent from the following description of the illustrative embodiment shown in the accompanying drawings, in which:

Figure 3 is a similar vertical section, showing the parts in the upper portion of Figure 2 on a still larger scale;

Figure 4 is a perspective view of the parts which operate the indicating mechanism of the meter;

Figure 5 is a front elevation of the chart plate of the meter; and

Figure 6 is a detail view of part of the indicator mechanism.

Figure 1:
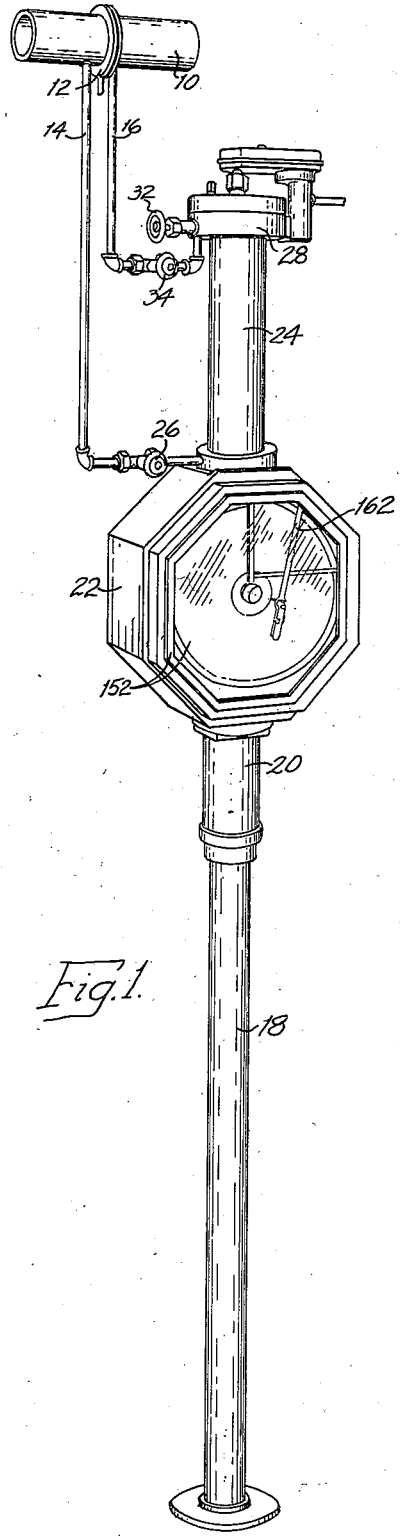
Figure 1 is a perspective view of the meter connected to be controlled by fluid flow through a conduit.
Figure 2:
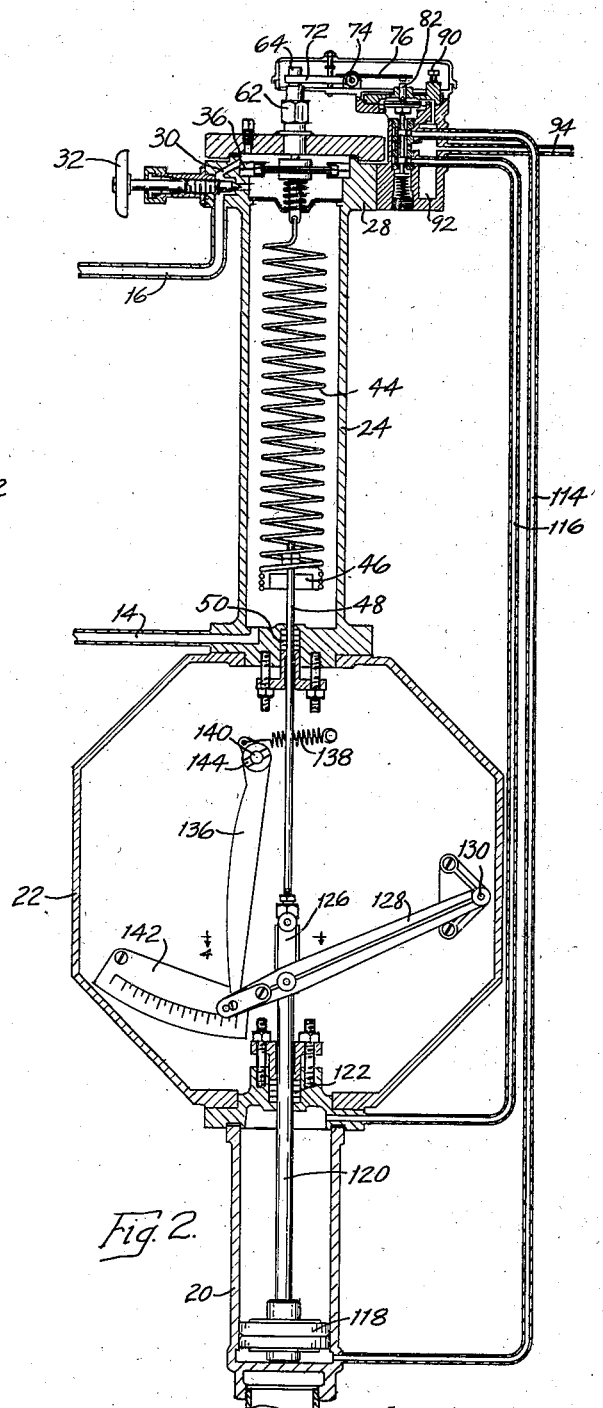
Figure 2 is a vertical section through the upper part of the meter, on a larger scale than Figure 1.

The mechanism embodying my invention is illustrated as embodied in a meter indicating the flow of a corrosive fluid through a conduit or the like 10 provided with an orifice plate or the equivalent 12, on opposite sides of which are connected relatively small pressure conduits 14 and 16 leading to the meter body, the conduit 14 being on the high pressure side.

The meter is illustrated as embodied in a standard or floor support, 18, the upper part of which forms a power cylinder 20, the cylinder in turn carrying an instrument casing 22, on top of which is mounted a pressure compartment such as a cylinder 24 axially alined with the cylinder 20.

The compartment 24 is shown with the conduit 14 opening into its lower end through a suitable shutoff valve 26, and is provided with a head 28 having a passage 30 to which the conduit 16 is connected through a shutoff valve 34. The device is also preferably provided with a needle valve 32 which can be opened to equalize the pressures above and below a diaphragm or the like 36, for use in calibrating the instrument.

The diaphragm 36 is weighted by plates 38 secured thereto by a nut 40 threaded on the stem of a headed fitting 42 passing through the center of the diaphragm. The fitting 42 is connected to the upper end of a coil tension spring 44 in the compartment 24, the lower end of the spring being adjustably threaded upon a head 46 rotatable on the upper end of a connecting rod 48 passing through a stuffing box 50 into the casing 22.

The weight of the diaphragm 36 and the parts supported thereby is preferably balanced by a spring 52 confined between the diaphragm and a stamping 54, so that this weight can be disregarded in calibrating the instrument.

The open upper face of the head 28 is closed by a plate 56 seated on a gasket 58 and carrying at its axis a thimble 60 to the end of which a nut 62 or the like seals a cup-shaped part 64 of non-magnetic material such as a high-chromium stainless steel.

The upper face of the fitting 42 is recessed to receive the pointed lower end of a connecting rod 66 carrying a soft-iron armature 68. The cup-shaped part 64 containing the armature 68 projects into a two-part upper housing 70, between the poles of a permanent horse-shoe magnet 72 pivoted at 74 and which, with a bar 76 attached thereto, forms a pivoted lever controlled by the position of the armature 68. The parts of the housing 70 may be secured together by suitable fastenings 78.

It will be noted that the diaphragm 36, and the parts which it controls, as well as the spring 44 which reacts on it, are all in a sealed chamber which is the only part of the apparatus accessible to the corrosive fluid in the conduit 10, and that the friction of the stuffing box 50 or the equivalent means for sealing about the connecting rod 48 has no effect on the sensitivity of the meter, since it acts on a part which is directly connected to and forcibly operated by the power piston 118 described below. Thus the sensitivity of the response of the spring 44 and the diaphragm 36 is not in any way affected by the friction, no matter how tightly it may be necessary to pack the joint.

It will be seen that the position of the lever 72—76 is controlled by the differential pressures on opposite sides of the orifice plate 12, and therefore by the square of the rate of flow. The arm 76 carries a fittting 80 which controls the exhaust of compressed air or other fluid from a nozzle 82 slidable through a boss in a closure plate 84, and carried by a weighted diaphragm 86.

The space below the diaphragm 86 is open to the atmosphere, while the compressed air is admitted to the space above it through a passage 88 adjustably controlled by a needle valve 90. The passage 88 leads from a pressure chamber 92 into which the compressed air is admitted, from any suitable source, through a conduit 94.

The pressure chamber 92 also communicates, through a port 96, with a central annular groove 98 in a stationary valve sleeve or cylinder 100, and thence through suitable openings 102 with the interior of the sleeve. Within the sleeve 100 is a vertically movable valve piston 104 having at its lower end a head resting on and urged upwardly by a spring 106, the tension of which can be set by adjusting a nut 108 provided with an opening therethrough so that atmospheric pressure acts on the lower end of the valve piston.

The upper end of the piston 104 engages the lower face of the weighted diaphragm 86, so that pressure on the upper face of the diaphragm forces the valve piston downwardly against the resistance of the spring 106.

The valve piston is formed with spaced collars normally blocking ports leading to annular passages 110 and 112 communicating with conduits 114 and 116 leading respectively to the bottom and top of the cylinder 20. The above-described parts form a pilot valve controlled by the position of the armature 68, and controlling the admission to, and exhaust from, the cylinder 20, of the compressed air.

The cylinder 20 contains a double-acting piston 118 having a piston rod 120 passing through a stuffing box 122 and adjustably coupled to the lower end of the connecting rod 48.

The connection between the rods 48 and 120 includes a swivel fitting 124 pivoted to a link 126, the lower end of which is pivoted to a lever or arm 128 mounted at one end on a fixed fulcrum 130.

The lever 128 carries at its end a cam roller 132, and a keeper plate 134, guiding an angularly movable square-root cam arm 136 held against the roller 132 by a spring 138, and mounted on a shaft 140. A scale 142 may be provided for the cam arm 136 if desired.

The shaft 140, if fixed to the cam arm 136 and turning therewith, or the hub of the cam arm 136, or both, are provided with means such as clutch notches 144 for clutching engagement with a transverse pin or the like 146 (Figure 5) carried by a shaft 148 journaled on the chart plate 150, adapted to be secured in the casing 22 over the above-described mechanism, just inside the glazed door 152. The shaft 148 is shown provided with an arm 154 connected by a link 156 to a bell crank lever 158 fixed on a shaft 160 journaled in the plate 150 and carrying the usual pen arm 162. The bellcrank 158 may also be connected by means such as a link 164 to operate a suitable integrator 166.

In operation, fluctuation in the pressures on opposite sides of the orifice plate 12, due to variations in fluid flow, cause the diaphragm 36 to shift the armature 68 to rock the lever 72—76 and thereby cause movement of the pilot valve 104 to admit compressed air to one of the conduits 114 or 116 and to cause the other one to exhaust to the atmosphere.

This actuates the piston 118 to rock the lever 128 to cause the square root cam lever 136 to set the pen arm 162 (and to change the control of the integrator 166), and at the same time to vary the tension of the spring 44 to balance the changed pressures on the diaphragm 36.

It will be noted that very few parts are in contact with the corrosive fluid being metered, and that those parts may readily be made of materials not affected by that particular fluid.

While one illustrative construction has been described in detail, it is not my intention to limit the scope of the invention to that particular construction, or otherwise than by the terms of the appended claims.

I claim:

1. A meter or the like comprising a standard adapted to rest on the floor and having its upper portion formed as a cylinder having a vertically movable piston therein, an indicator mounted on the upper end of said cylinder and provided with a casing and with indicator mechanism in said casing connected to said piston to be actuated thereby, a pressure compartment mounted on the top of said casing substantially in alinement with said cylinder, a diaphragm dividing said compartment into upper and lower parts, means for yieldingly axially connecting said diaphragm to said piston, means for connecting said upper and lower parts to sources of differential pressures, means for introducing pressure fluid into the cylinder on opposite sides of said piston and which means is provided with a control valve, and means mounted on the upper part of said compartment and controlled by said diaphragm and which in turn controls said valve.

2. A meter or the like comprising a standard adapted to rest on the floor and having its upper portion formed as a cylinder having a vertically movable piston therein, an indicator mounted on the upper end of said cylinder and provided with a casing and with indicator mechanism in said casing connected to said piston to be actuated thereby, a pressure control device mounted on the top of said casing substantially in alinement with said cylinder, means for yieldingly connecting the control device to said indicator mechanism, means for connecting said control device to sources of differential pressures, means for introducing pressure fluid into the cylinder on opposite sides of said piston and which means is provided with a control valve, and means mounted on and actuated by said control device and which in turn controls said valve.

3. A meter or the like comprising a vertical cylinder having fluid-pressure connections and a pressure-differential-operated device arranged between said connections and dividing it into two parts, a power cylinder below and in line with said vertical cylinder and containing a power piston, a connecting linkage extending upwardly from the power piston substantially axially of said cylinders, a spring in the lower part of the upper cylinder connecting the linkage and the pressure-differential device and reacting on the latter, means controlled by the pressure-differential device and controlling the power admitted to the power cylinder, and an indicator mechanism between the two cylinders and actuated by said linkage, said indicator mechanism including a casing mounted on the upper end of the power cylinder and supporting the lower end of said vertical cylinder and containing a pivoted arm linked to said linkage and an indicator having an actuating arm formed on one edge as a square-root cam and operatively engaged by means carried by the pivoted arm.

4. A meter or the like comprising a vertical cylinder having fluid-pressure connections and a pressure-differential-operated device arranged between said connections and dividing it into two parts, a power cylinder below and in line with said vertical cylinder and containing a power piston, a connecting linkage extending upwardly from the power piston substantially axially of said cylinders, a spring in the lower part of the upper cylinder connecting the linkage and the pressure-differential device and reacting on the latter, means controlled by the pressure-differential device and controlling the power admitted to the power cylinder, and an indicator mechanism between the two cylinders and actuated by said linkage, said indicator mechanism being provided with a casing mounted on the upper end of the power cylinder and supporting the lower end of said vertical cylinder.

5. A meter or the like comprising a standard adapted to rest on the floor and having its upper portion formed as a cylinder having a vertically movable piston therein, a hollow casing mounted on the upper end of the cylinder, a pressure control device including a pressure compartment mounted on top of said casing, a horizontal diaphragm dividing said compartment into upper and lower parts, means for connecting said upper and lower parts respectively to sources of differential pressure, a rod connected to said piston and extending through said casing into said lower compartment part, a spring in said lower part connecting the rod to the diaphragm, and a control device mounted on the pressure control device actuated by said diaphragm for controlling admission of fluid pressure to one side or the other of said piston.

ALBERT F. SPITZGLASS.